UNITED STATES PATENT OFFICE.

JACOB J. BROZ, OF ST. LOUIS, MISSOURI.

SHOE-POLISH.

1,231,997. Specification of Letters Patent. Patented July 3, 1917.

No Drawing. Application filed August 23, 1915. Serial No 46,802.

*To all whom it may concern:*

Be it known that I, JACOB J. BROZ, a citizen of the United States, residing at the city of St. Louis, in the State of Missouri, have invented certain new and useful Improvements in Shoe-Polishes, of which the following is a specification.

This invention relates to leather-dressings and more particularly to a tan polish for shoes and other articles made of leather.

The composition constituting the polish of this invention is produced by preparing three solutions each having characteristic properties, said solutions being for convenience designated herein as a shellac solution, a moss solution, and a soap solution, and then mixing said solutions with liquid luster and with dry colors in substantially the proportions and the manner hereinafter described.

The shellac solution consists of about 2 ounces or orange shellac and about 8 ounces of powdered borax boiled in about 1 gallon of water until dissolved. The solution may then be allowed to cool and may be strained through cheese cloth or the like.

The moss solution consists of about 6½ ounces of Irish moss, about 2 ounces of Conti soap (which is an article of commerce imported under that name from Italy and which may in a general way be described as saponified olive oil), and about 1¾ ounces of carnauba wax boiled in about 1 gallon of water until dissolved. This solution may then be allowed to cool and may be strained through a cheese cloth or the like.

The soap solution consists of about 12 ounces of Conti soap, about 14 ounces of carnauba wax, and about 1 ounce of beeswax boiled in about 1 gallon of water until dissolved. This solution may then be allowed to cool and may be strained through a cheese cloth or the like.

These three solutions are then mixed together in substantially the following proportions:

1 quart of the shellac solution,
½ quart of the moss solution,
2 quarts of the soap solution.

To this mixture of the three solutions there is added about ½ quart of liquid tan luster, about 24 ounces dry orange chrome yellow, about 8 ounces dry Indian red chrome (which is a pigment containing about ninety-five per cent. sesqui-oxid of iron, roasted to give the desired shade), and about 4 ounces dry lemon chrome. These solutions and the other ingredients are then thoroughly mixed together by any suitable means, such, for instance, as by means of grinding them in a mill. After grinding, the product may be strained through a screen, such, for instance, as wire screen made of 250 mesh brass wire cloth.

The three solutions, the liquid luster, and the dry colors constituting the final product may be mixed together without heating them, and it will result in a liquid polish of such consistency that it may be applied in the manner of paint by means of a brush upon the leather article to be polished thereby.

The tan luster referred to herein may be made in two ways; one way being to prepare a mixture composed of about 1 gallon water, about 8 ounces Conti soap, about 1¼ pounds carnauba wax, and about ½ ounce oleic acid, then boiling this mixture until the wax is thoroughly dissolved and adding, while boiling, about 1 ounce caustic soda, stirring very rapidly until the mixture is liquefied and adding about ½ ounce dry powdered commercial lemon anilin dye to color the mixture; the other way being to boil wax soap in a jacket kettle until dissolved and then adding a hot solution of caustic soda dissolved in about 1 gallon water and constantly stirring the mixture very rapidly until liquefied.

I claim:

1. The herein described composition for dressing leather formed by mingling a shellac solution, a moss solution, a soap solution, liquid luster, and dry colors substantially in the proportions stated.

2. The herein described composition for dressing leather formed by mingling a shellac solution, a moss solution, a soap solution, liquid luster, and dry colors substantially in the proportions stated, the solvent forming said solutions being water.

3. A leather dressing formed by mingling a solution formed by dissolving orange shellac and borax in water, a solution formed by dissolving moss, soap, and carnauba wax in water, a solution formed by dissolving soap, carnauba wax, and beeswax in water, the ingredients of each solution being substantially in the proportions described, and dry colors substantially in the proportions stated.

4. A leather polish formed by mingling a solution formed by dissolving shellac and borax in water, a solution formed by dissolving moss, soap, and carnauba wax in water, a solution formed by dissolving soap, carnauba wax, and beeswax in water, the ingredients of each solution being substantially in the proportions described, a liquid luster, and dry colors substantially in the proportions stated.

5. A leather polish formed by mingling an aqueous solution in which shellac is the characteristic ingredient, an aqueous solution in which moss is the characteristic ingredient, an aqueous solution in which soap is the characteristic ingredient, a luster, and dry colors substantially in the proportions described.

6. A leather polish formed by mingling an aqueous solution in which shellace is the characteristic ingredient, an aqueous solution in which moss is the characteristic ingredient, an aqueous solution in which soap is the characteristic ingredient, the herein described tan luster, and dry colors substantially in the proportions described to form a liquid composition.

In testimony whereof I hereunto affix my signature.

JACOB J. BROZ.